United States Patent Office 3,513,076
Patented May 19, 1970

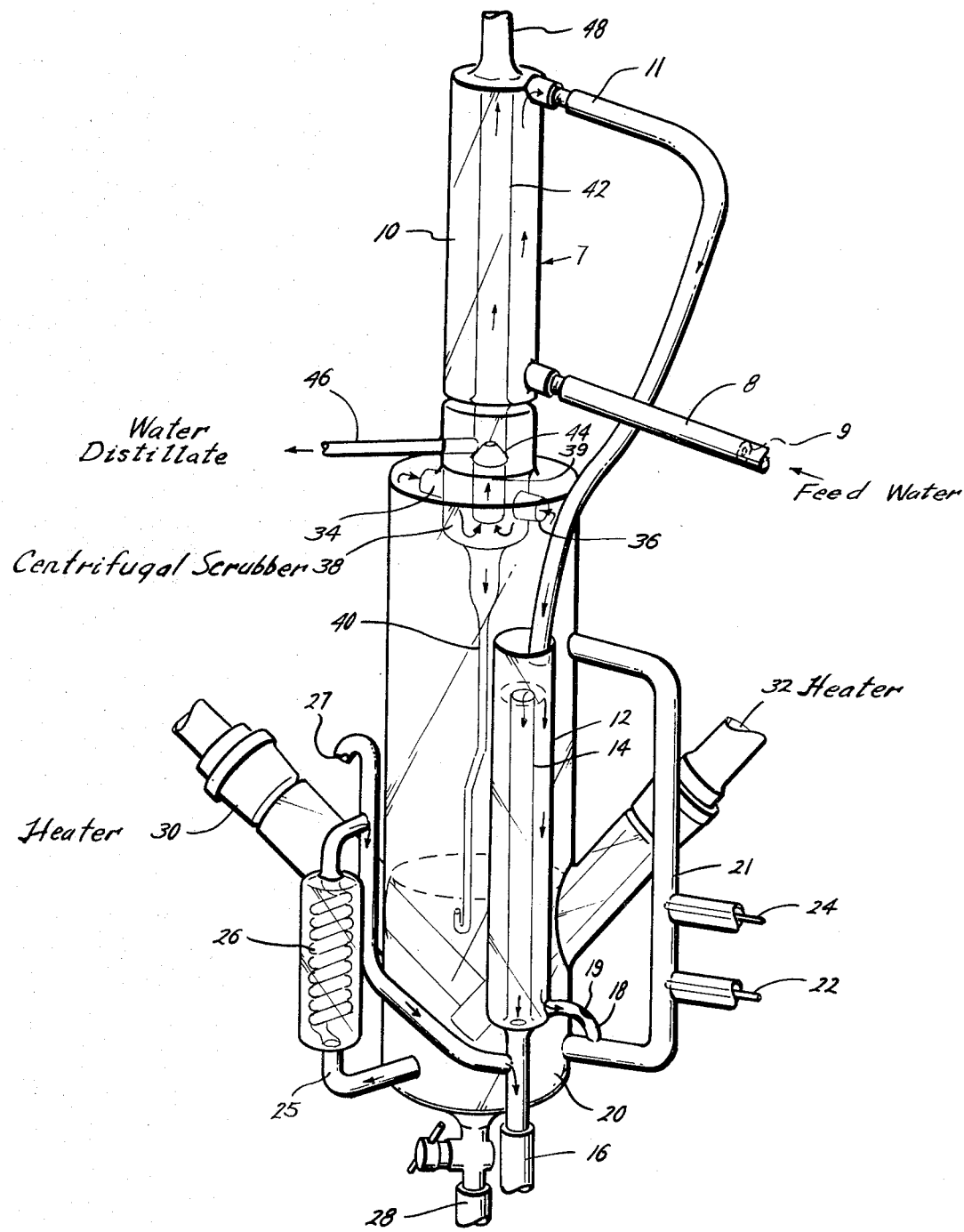

3,513,076
APPARATUS AND METHOD FOR HIGH
PURITY DISTILLATION
Philip S. Lowell, Austin, Tex., assignor to Tracor, Inc.,
Austin, Tex., a corporation of Texas
Filed Aug. 31, 1965, Ser. No. 484,013
Int. Cl. B01d 3/26
U.S. Cl. 203—10                                   17 Claims

ABSTRACT OF THE DISCLOSURE

Distillation apparatus, which is particularly suitable for high purity distillation of tap water, comprises a centrifugal scrubber for removal of entrained liquid from the heated vapor in combination with a condenser having a vertically disposed condensing surface and a vent open to ambient to permit volatile inpurities to escape and note be dissolved in the vapor condensed on the condensing surface.

The invention concerns methods and apparatus suitable for distillation, particularly distillation of tap water to achieve a condensate of high purity for laboratory and scientific use.

In ordinary distillation procedures it is very difficult to obtain a condensate of a degree of purity sufficiently high for scientific use, such as in chemical analyses. Further, distillation apparatus for laboratory use should be compact, able to produce a condensate of a sufficiently high degree of purity in a single distilling operation, and convenient and easy to use.

In accordance with the invention, methods and apparatus for distilling liquid are provided which are particularly suitable for use in chemical laboratories. Of course, the methods and apparatus described herein need not necessarily be limited to such a use, for the principles disclosed herein are equally applicable to large commercial distillation procedures, but the principles are particularly applicable to the purification of tap water into highly purified distilled water suitable for use in chemical analyses or reactions.

One embodiment of distillation apparatus in accordance with the invention comprises a heating chamber, means for heating liquid placed in the chamber to form a vapor, a centrifugal scrubber associated with the chamber for removing entrained liquid from the vapor, a condenser communicating with the vapor outlet of the scrubber whereby purified liquid can be collected, a cooling liquid outlet on the condenser communicating with the interior of the heating chamber for providing liquid thereto for vaporization, and means between the cooling liquid outlet and the heating chamber for maintaining a substantially constant head of liquid to the heating chamber.

Operation and effectiveness of the distillation apparatus can be enhanced by providing the condenser with a vent to permit volatile impurities to escape to ambient and not be dissolved in the purified liquid produced. In particular, the vent should be located such that volatile impurities normally gaseous at room temperature, such as nitrogen, oxygen, carbon dioxide, and chlorine, can be vented without dissolution into the purified liquid before its collection and removal from contact with the volatile impurities.

A particularly effective combination which can be employed to enhance the effectiveness of distillation apparatus and thereby provide a condensate of high purity comprises a centrifugal scrubber having a vapor inlet tangential to the walls thereof, or otherwise disposed to receive vapor from the heated liquid and remove entrained liquid from the vapor; and a condenser disposed to communicate with the vapor outlet of the scrubber, the condensing surface of the condenser being disposed vertically whereby vapor condensed therein can by gravitational force run down the condensing surface to a location for collection, such as an annular lip or trap intertior of a cylindrical condensing surface and communicating with a purified liquid outlet, with the condenser having a vent to permit volatile impurities to escape and not be dissolved in the vapor condensed on the condensing surface and collected therefrom.

Operation and effectiveness of the distillation apparatus can also be improved by providing the heating chamber with a liquid outlet having a liquid head thereagainst of a value less than the head on the liquid inlet to the heating chamber, whereby liquid flow through the chamber can be achieved and liquid containing nonvolatile material and other impurities can be constantly removed from the heating chamber.

An embodiment of a process in accordance with the invention suitable for high purity distillation of water or other liquid comprises heating liquid to form a vapor, passing the vapor through a centrifugal scrubbing means to remove entrained liquid, condensing the vapor on a vertically disposed condensing surface to form a thin film of purified liquid capable of running down the condensing surface, maintaining the thin film of liquid at a temperature below its boiling but at a temperature sufficient to minimize dissolution of volatile impurities therein, collecting the thin film while maintaining the temperature, and venting volatile impurities to ambient while maintaining the temperature and collecting the thin film of liquid. This process provides a liquid condensate of high purity by removing most of the otherwise troublesome gases such as oxygen and carbon dioxide which are normally found in distilled water. Virtually all of the troublesome gases can be removed by, in addition, contacting the thin film of liquid countercurrently with the vapor, thereby stripping volatile impurities out of the thin film of liquid. Countercurrent flow of the thin film of liquid to the vapor can lower the volatile impurities dissolved in the final product by a factor of up to 10,000 times or more as compared with a final product produced in the presence of cocurrent flow.

A preferred process in accordance with the invention comprises the above process along with the steps of employing a cooling liquid to condense the vapor on the vertically disposed condensing surface and then employing the cooling liquid after use for condensation purposes to provide a liquid head in the supply of liquid for vaporization in the heating chamber. Similarly, a preferred process includes providing a drain on the liquid supplied for vaporization which must operate against a liquid head of value less than the cooling liquid head in the supply of liquid for vaporization, thereby ensuring at least continual removal of enriched liquid to avoid concentration of impurities too high in the vaporization chamber for efficient high purity distillation.

An embodiment in accordance with the invention will now be specifically described with reference to the drawing, wherein arrows are employed to indicate direction of water flow. As there shown, water enters a water jacket 10 in a condenser 7 by way of a water inlet 8 which may contain an orifice 9 to regulate flow in the inlet water line. The cooling water flows up through the water jacket 10 to a cooling water outlet 11. The cooling water then flows to a reservoir for mainintaing a supply of water for distillation purposes of substantially constant liquid head. As shown, the cooling water outlet empties into a cylinder 12 having an overflow tube 14 positioned concentrically therein which empties into an enriched water outlet 16. The column of water between the cylinder 12 and the overflow tube 14 maintains a liquid head on the tube 18 which communicates with a heating chamber 20 in the still to convey water thereto. The tube 18 may include an orifice 19 to minimize sudden surges of water in either direction through the tube 18.

A gauge tube 21 communicates with the heating chamber 20 both above and below the desired level of water therein. Electrical contacts 22 and 24 may be spaced in the gauge tube 21 and connected such that heat supplied to the chamber 20 will be stopped automatically if the water level gets too low in the heating chamber 20, thereby avoiding boiling the still dry. Other means of avoiding boiling the still dry, of course, may be substituted.

Enriched water leaves the heating chamber 20 by way of an outlet tube 25 which empties into the enriched water outlet 16. The resistance tube 26 regulates the flow of liquid forced out of the heating chamber 20 into the enriched water outlet 16. The outlet tube 25 is positioned to provide a liquid head in the outlet of a value less than the liquid head of supply water in the annular space between the cylinder 12 and the overthrow tube 14. The outlet tube 25 is also desirably provided with a suction break 27 to ensure even flow of enriched water out of the heating chamber to the enriched water outlet 16. Thus, a continuous flow of enriched water out of the heating chamber 20 is assured by the difference in magnitude between the inlet water head and the outlet water head, thereby assuring efficient distillation by the continuous removal of enriched water and maintenance of water for vaporiation of as low impurity content as practical.

A drain may also be provided on the heating chamber to permit draining of the heating chamber as well as the still after use. Heating means, such as electrical resistance heaters 30 and 32, is located to heat the liquid in the heating chamber 20. The heaters 30 and 32, upon actuation, cause the water in the heating chamber 20 to vaporize, the vapor passing upward into vapor inlets 34 and 36 disposed tangentially on the walls of a centrifugal scrubber 38. The centrifugal scrubber 38 removes entrained matter from the vapor entering therein and conducts the entrained matter by way of entrained liquid outlet 40 away from the vapor. As shown the entrained liquid outlet 40 extends into the liquid in the heating chamber 20 below the surface thereof for conducting the entrained matter back to the liquid in the heating chamber 20. However, the entrained matter may be led directly to a drain if so desired. A single heater, of course, may be employed as the heating means.

The centrifugal scrubber 38 includes a vapor outlet 39 extending from below the point of entrance of the vapor inlets 34 and 36 up to the top of the scrubber where the vapor outlet communicates with the interior condensing surface 42 of the condenser 7. The water flowing through the water jacket 10 condenses the water vapor on the condensing surface 42 where the condensed water flows down the condensing surface by gravitational force as a thin film to an annular lip or trap 44 disposed on the condensing surface 42. The lip or trap 44 provides a liquid collection means for the purified water, and communicates with a purified water outlet 46, which may be led to a location for storage of the purified water.

The condenser 7 is also provided preferably near its top with an outlet 48 for gas or other volatile impurities originally dissolved in the cooling water entering the water jacket 10 and then vaporized in the heating chamber 20. The outlet 48 may communicate with the atmosphere or other ambient conditions for removal of the volatile impurities. As shown, the condenser is preferably constructed to provide countercurrent flow between the thin film of condensate and the vapor passing to ambient.

The combination of the centrifugal scrubber and the condenser having vertically disposed condensing surfaces therein along with a gas vent is a very important feature in the apparatus described above. This combination has been found to be particularly effective in distillation apparatus suitable for high purity distillation, particularly small compact apparatus for laboratory work. The scrubber 38 removes entrained matter, and the condenser is so designed as to remove volatile impurities and keep them from redissolving in the purified water. In this regard, the vapor leaving the scrubber, having a low concentration of volatile impurities, is effective in removing volatile impurities from the liquid near the collecting lip 44. As the vapor rises in the condenser the liquid condenses out, thereby concentrating the volatile impurities in the vapor. Any volatile impurities dissolving into the liquid at the top of the condenser, where the vapor is concentrated in volatile impurities, is stripped out in the bottom of the condenser, where the vapor is relatively dilute in volatile impurities. In addition, by maintaining the thin film of liquid at a proper temperature dissolution of volatile impurities in the thin film of liquid can be minimized. Thus, the thin film of purified water collected in the lip or trap 44 and communicated to the purified water outlet 46 is maintained substantially free of the volatile impurities which so frequently are troublesome in laboratory analyses.

Of course, various modifications in the above described specific embodiment may be made without departing from the principles disclosed herein. For example, the gas vent on the condenser 7 need not be located near the top of the condenser but may extend into the interior of the condensing surface 42 at any location, preferably disposed however to avoid passing too much water vapor out to the atmosphere through the outlet 48.

Likewise, the centrifugal scrubber may be of several conventional designs, although a scrubber with the vapor inlet set tangentially to the walls of the scrubber is preferred. In addition, although the condenser 7 is preferably vertically disposed immediately above the centrifugal scrubber 38, the condenser may be located elsewhere with the vapor inlet to the condenser 7 located at any suitable location. If the vapor inlet is at the top of the condenser 7, the vent for volatile impurities may be located near the bottom of the condenser 7 with its end disposed so that the thin film of purified water running down the condensing surfaces of the condenser 7 does not enter the gas vent in significant amounts. This design is not preferred, however, since a countercurrent stripping action is not provided by the design.

The apparatus disclosed above may be constructed principally of glass such as Pyrex, or other suitable materials. Brass, stainless steel, and polyolefins may be employed for certain components. Of course, suitable connections between various components may be made according to convenience or the particular structural strength desired.

It will be apparent that the above described apparatus and methods are suitable for providing high purity distillation of a liquid, particularly water for laboratory use. Actual tests have established that a condensate of high purity suitable for use in laboratory analysis can be conveniently obtained.

What is claimed is:

1. In distillation apparatus suitable for high purity distillation of liquid, particularly tap water, the combination of a centrifugal scrubber disposed to receive vapor from a heated liquid and to remove entrained liquid from the vapor, and a condenser disposed to communicate with the vapor outlet of the scrubber; the condensing surface of said condenser being disposed vertically whereby vapor condensed therein can by gravitational force run down said surface to a location for collection; said condenser having a vent directly open to ambient to permit volatile impurities to escape and not be dissolved in the vapor condenser therein.

2. In distillation apparatus suitable for high purity distillation of liquid, particularly tap water, the combination of a centrifugal scrubber having a vapor inlet tangentially of the walls thereof, an entrained liquid outlet near the bottom thereof, and a vapor outlet near the top thereof; and a condenser communicating with said vapor outlet near the bottom of said condenser, said condenser having a vertically disposed condensing surface, a vent near its top to permit escape of volatile impurities, and liquid collection means near its bottom for collecting condensed purified liquid as it runs down the condensing surface, whereby a thin film of liquid running down the condensing surface can contact rising vapor countercurrently.

3. Distillation apparatus suitable for high purity distillation of liquid, particularly tap water, comprising a heating chamber for holding liquid; means for heating the liquid to form a vapor; a centrifugal scrubber associated with said chamber and having a vapor inlet tangentially of the walls thereof to receive vapor from said chamber, an entrained liquid outlet near the bottom thereof, and a vapor outlet near the top thereof; a condenser disposed to communicate with said vapor outlet, said condenser having a vertically disposed condensing surface to permit vapor condensed thereon to run down said surface to a location for collection, and having a vent to permit volatile impurities to escape and not be dissolved in the vapor condensed therein; a cooling liquid outlet on said condenser communicating with the interior of said chamber for providing liquid thereto for vaporization; and means associated with said cooling liquid outlet and said heating chamber for maintaining a substantially constant head of liquid to said heating chamber.

4. The distillation apparatus defined in claim 3 wherein said means for heating is an electric heater and said heating chamber is provided with a liquid outlet having a liquid head thereagainst of a value less than the head provided by the means for maintaining a head of liquid to said chamber, whereby liquid flow through said chamber can be achieved.

5. The distillation apparatus defined in claim 4 wherein said condenser communicates with said vapor outlet near the bottom of said condenser, and said condenser has a vent near its top to permit escape of volatile impurities and a liquid collection means near its bottom for collecting condenser purified liquid as it runs down the condensing surface thereof, whereby countercurrent flow between said condenser purified liquid and said volatile impurities is achieved.

6. The distillation apparatus defined in claim 5 wherein said liquid collection means includes a lip communicating with a purified liquid outlet and disposed to collect a thin film of purified liquid and transfer the purified liquid to said purified liquid outlet.

7. Distillation apparatus for high purity distillation of tap water, comprising a heating chamber for holding tap water; means for heating the tap water to form a vapor; a centrifugal scrubber associated with said chamber and having a vapor inlet tangentially of the walls thereof to receive vapor from said chamber, an entrained liquid outlet near the bottom thereof, and a vapor outlet near the top thereof; a condenser disposed to communicate with said vapor outlet, said condenser having a vertically disposed condensing surface to permit vapor condensed thereon to run down said surface to a location for collection, and having a vent to permit volatile impurities to escape and not be dissolved in the vapor condensed therein; a source of tap water; a tap water inlet on said condenser communicating with said source of tap water; a cooling liquid outlet on said condenser communicating with the interior of said chamber for providing tap water thereto for vaporization; and means associated with said cooling liquid outlet and said heating chamber for maintaining a substantially constant head of tap water to said heating chamber.

8. The distillation apparatus defined in claim 7 wherein said heating chamber is provided with a liquid outlet having a liquid head thereagainst of a value less than the head provided by the means for maintaining a head of tap water to said chamber, whereby liquid flow through said chamber can be achieved.

9. The distillation apparatus defined in claim 7 wherein said condenser communicates with said vapor outlet near the bottom of said condenser, and said condenser has a vent near its top to permit escape of volatile impurities and a liquid collection means near its bottom for collecting condensed purified water as it runs down the condensing surface thereof, whereby countercurrent flow between said condensed purified water and said volatile impurities is achieved.

10. A process suitable for high purity distillation of liquid, particularly tap water, which process comprises heating liquid to form a vapor, passing said vapor through a centrifugal scrubber to remove entrained liquid, condensing said vapor on a vertically disposed condensing surface to form a thin film of purified liquid capable of running down said condensing surface, maintaining said thin film of liquid at a temperature below boiling but at a temperature sufficient to minimize dissolution of volatile impurities therein, collecting said thin film while maintaining said temperature, and venting said volatile impurities to ambient while maintaining said temperature and collecting said thin film.

11. The process defined in claim 10 wherein said liquid is tap water.

12. A process suitable for high purity distillation of liquid, particularly tap water, which process comprises maintaining a supply of liquid for vaporization, heating said liquid to form a vapor, passing vapor through a centrifugal scrubber to remove entrained liquid, employing a cooling liquid to condense said vapor on a vertically disposed condensing surface to form a thin film of purified liquid capable of running down said condensing surface, maintaining said thin film of liquid at a temperature below boiling but at a temperature sufficient to minimize dissolution of volatile impurities therein, collecting said thin film while at said temperature, venting said volatile impurities to ambient while maintaining said temperature and collecting said thin film, and employing said cooling liquid to provide a liquid head on said supply of liquid for vaporization.

13. The process defined in claim 12 wherein said cooling liquid is tap water.

14. The process defined in claim 12 wherein a portion of said supply of liquid for vaporization is drained as liquid against a liquid head of value less than the cooling liquid head on said supply of liquid for vaporization.

15. The process defined in claim 12 wherein said thin film of liquid is condensed so as to run down said condensing surface countercurrently with respect to the flow of said vapor.

16. A process suitable for high purity distillation of liquid, particularly tap water, which process comprises maintaining a supply of liquid for vaporization, heating said liquid to form a vapor, passing said vapor through a centrifugal scrubber to remove entrained liquid, employing a cooling liquid to condense said vapor on a vertically disposed condensing surface to form a thin film of purified liquid capable of running down said condensing surface countercurrently to the flow of said vapor, collecting said thin film, and venting volatile impurities in said vapor to ambient at a location which permits said vapor to flow countercurrently to said thin film of purified liquid.

17. The process defined in claim 16 wherein said cooling liquid is tap water and wherein said cooling liquid is employed to provide a liquid head on said supply of liquid for vaporization.

References Cited

UNITED STATES PATENTS

| | | | |
|---|---|---|---|
| 2,164,275 | 6/1939 | Ittner | 202—177 |
| 2,199,320 | 4/1940 | LeJuge | 203—10 X |
| 2,803,590 | 8/1957 | Skow | 203—10 X |
| 2,837,469 | 6/1958 | Mohn | 203—10 |
| 3,020,215 | 2/1962 | Weber | 202—197 |
| 3,055,810 | 9/1962 | Skow | 203—10 X |
| 3,080,302 | 3/1963 | Rodgers et al. | 203—10 |
| 3,235,470 | 2/1966 | Miller | 202—197 X |
| 524,887 | 8/1894 | Craney | 203—10 |
| 698,724 | 4/1902 | Murphy | 203—10 X |
| 1,183,142 | 5/1916 | Underwood | 203—11 |
| 1,404,972 | 1/1922 | Kells | 203—1 X |

FOREIGN PATENTS

| | | |
|---|---|---|
| 271,106 | 10/1950 | Germany. |
| 670,439 | 4/1952 | Great Britain. |

OTHER REFERENCES

Kontes Glass Co. Bulletin No. 465, April 1965.

NORMAN YUDKOFF, Primary Examiner

F. E. DRUMMOND, Assistant Examiner

U.S. Cl. X.R.

23—259; 202—167, 197